United States Patent
Ye et al.

(10) Patent No.: US 10,699,691 B1
(45) Date of Patent: Jun. 30, 2020

(54) ACTIVE NOISE CANCELLATION FOR BONE CONDUCTION SPEAKER OF A HEAD-MOUNTED WEARABLE DEVICE

(71) Applicant: Amazon Technologies, Inc., Seattle, WA (US)

(72) Inventors: Geng Ye, San Jose, CA (US); Zhen Xu, Santa Clara, CA (US); Haoxing Zhang, Sunnyvale, CA (US); Bozhao Tan, Sunnyvale, CA (US); Xuan Zhong, Mountain View, CA (US); Jianchun Dong, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/637,532

(22) Filed: Jun. 29, 2017

(51) Int. Cl.
G10K 11/178 (2006.01)
H04R 3/00 (2006.01)
(Continued)

(52) U.S. Cl.
CPC ........ G10K 11/178 (2013.01); G02B 27/0176 (2013.01); G02C 5/14 (2013.01);
(Continued)

(58) Field of Classification Search
CPC ............. H04R 3/005; H04R 2410/05; H04R 2460/13; H04R 1/1016; H04R 1/1083; H04R 2460/01; H04R 3/002; H04R 1/105; H04R 1/2811; H04R 1/2876; H04R 1/2896; H04R 2420/01; H04R 25/505; H04R 3/12; H04R 5/04; H04R 9/066; G10K 11/1786; G02C 11/10; G02B 27/00; H04M 1/05; H04M 1/2155; H04M 1/60; H04M 1/72791
(Continued)

(56) References Cited

U.S. PATENT DOCUMENTS 6,211,799 B1 * 4/2001 Post ................. A61B 5/0028
341/33
9,223,451 B1 * 12/2015 Raffle ................ G06F 3/044
(Continued)

FOREIGN PATENT DOCUMENTS

KR 20100121176 A * 12/2010 .......... H04R 1/1041
KR 20100121176 A1 * 12/2010 .......... H04R 1/1041
KR 20100121176 A2 * 12/2010

OTHER PUBLICATIONS

"Speaker-1115-3.5-SC-Cobra", Knowles Electronics, Inc., Product Data Sheet 2403 260 00091, Release—Revision: C, 2011, pp. 1-20.
(Continued)

Primary Examiner — Vijay B Chawan
(74) Attorney, Agent, or Firm — Lindauer Law, PLLC (57) ABSTRACT

A head-mounted wearable device (HMWD) may incorporate bone conduction speakers (BCS) to generate audio output that is perceptible to a wearer. During operation, vibrations of the BCS may produce sound in the surrounding air that is perceptible to bystanders. An active noise cancellation module monitors the output and generates cancellation audio that is out of phase with the sound leaked by the BCS. An air conduction speaker emits the cancellation audio, producing destructive acoustic interference to the leaked sound. As a result, the user of the HMWD is able to hear audio clearly while bystanders are not.

22 Claims, 7 Drawing Sheets

(51) Int. Cl.
  *G02B 27/01* (2006.01)
  *G02C 5/14* (2006.01)
  *G02C 11/00* (2006.01)
  *G02C 5/22* (2006.01)
(52) U.S. Cl.
  CPC ............. *G02C 11/10* (2013.01); *H04R 3/005* (2013.01); *G02B 2027/0178* (2013.01); *G02C 5/22* (2013.01); *G10K 2210/1081* (2013.01); *G10K 2210/3028* (2013.01); *G10K 2210/3046* (2013.01); *H04R 2460/13* (2013.01)
(58) Field of Classification Search
  USPC ............ 704/226–228, 233; 345/8, 633, 156; 381/151, 120, 380, 71.11, 71.6; 340/10.51, 870.37; 455/100
  See application file for complete search history.

(56) References Cited

U.S. PATENT DOCUMENTS

| | | | |
|---|---|---|---|
| 9,482,882 B1 | 11/2016 | Hanover et al. | |
| 9,486,167 B2* | 11/2016 | Martinez | G06F 15/00 |
| 9,729,978 B2* | 8/2017 | Qi | H04R 1/2811 |
| 9,741,169 B1* | 8/2017 | Holz | G06T 19/006 |
| 9,799,301 B2* | 10/2017 | Sahin | G06F 1/163 |
| 9,807,291 B1* | 10/2017 | Tome | H04N 1/00204 |
| 2001/0031062 A1* | 10/2001 | Terai | H04R 5/033 381/370 |
| 2006/0238877 A1* | 10/2006 | Ashkenazi | G02B 27/0093 359/630 |
| 2011/0293105 A1* | 12/2011 | Arie | H04M 1/05 381/71.11 |
| 2011/0301729 A1* | 12/2011 | Heiman | H04S 7/301 700/94 |
| 2013/0204617 A1* | 8/2013 | Kuo | H04R 3/002 704/233 |
| 2013/0329918 A1* | 12/2013 | Kubba | G02B 27/017 381/151 |
| 2014/0232981 A1* | 8/2014 | Sugihara | G02B 27/017 351/158 |
| 2015/0070251 A1* | 3/2015 | Kim | G06F 1/163 345/8 |
| 2015/0091943 A1* | 4/2015 | Lee | G02B 27/0172 345/633 |
| 2015/0138224 A1* | 5/2015 | Kim | G02B 27/0172 345/592 |
| 2015/0153224 A1* | 6/2015 | Shibayama | G01J 3/26 356/416 |
| 2015/0153825 A1* | 6/2015 | Lee | G02B 27/0172 345/8 |
| 2015/0199950 A1* | 7/2015 | Heiman | G10K 11/002 381/71.1 |
| 2015/0268721 A1* | 9/2015 | Joo | G02B 27/0093 345/156 |
| 2016/0034042 A1* | 2/2016 | Joo | G02B 27/0172 345/633 |
| 2016/0063986 A1* | 3/2016 | Ben-Ami | H04R 1/1083 381/71.6 |
| 2016/0306173 A1* | 10/2016 | Tsukahara | G02B 27/02 |
| 2017/0168566 A1* | 6/2017 | Osterhout | G06F 3/012 |

OTHER PUBLICATIONS

Kuo, et al., "Active Noise Control: A Tutorial Review", Proceedings of the IEEE, vol. 87, No. 6, Jun. 1999, pp. 943-973.

Kuo, et al., "Design of Active Noise Control Systems With the TMS320 Family", Texas Instruments, Digital Signal Processing Products—Semiconductor Group, SPRA042, Jun. 1996, 171 pages. Retrieved from the Internet: <URL: https://www.ti.com/lit/an/spra042/spra042.pdf>.

Manikandan, S., "Recent Review of Active Noise Control Systems Using DSP Based Adaptive Algorithms", Proceedings of the 2014 International Conference on Circuits, Systems and Control, pp. 118-122.

"Active Noise Control Using a Filtered-X LMS FIR Adaptive Filter", Mathworks, Inc., MATLAB & Simulink Example. Retrieved from the Internet: <URL:https://www.mathworks.com/help/audio/examples/active-noise-control-using-a-filtered-x-lms-fir-adaptive-filter.html?requestedDomain=www.mathworks.com>.

Pathak, et al., "FXLMS Algorithm for Feed Forward Active Noise Cancellation", Proc. of the Intl. Conf. on Advances in Computer, Electronics and Electrical Engineering, 2012 Universal Association of Computer and Electronics Engineers. pp. 18-22.

Priyanga, et al., "Active Noise Cancellation System Using DSP Processor", International Journal of Scientific & Engineering Research, vol. 4, Issue 4, Apr. 2013, pp. 699-704. Retrieved from the Internet: <URL:http://www.jser.org/paper/Active-Noise-Cancellation-System-Using-DSP-Prosessor.html>.

Siravara, et al., "A Novel Approach for Single Microphone Active Noise Cancellation", Texas Instruments Inc. and The University of Texas at Dallas, Department of Electrical Engineering. Retrieved from the Internet: <URL:https://www.researchgate.net/publication/4007965_A_Novel_Approach_for_Single_Microphone_Active_Noise_Cancellation>.

\* cited by examiner

ACTIVE NOISE CANCELLATION FOR BONE CONDUCTION SPEAKER OF A HEAD-MOUNTED WEARABLE DEVICE

BACKGROUND

Wearable devices provide many benefits to users, allowing easier and more convenient access to information and services. Wearable devices may provide output that is audible to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor that is ubiquitous and easily worn, such as eyeglasses, may facilitate access to information.

The HMWD may operate independently as a standalone device, or may operate in conjunction with another computing device. For example, the HMWD may operate in conjunction with a smart phone, tablet, network service operating on servers, and so forth. The HMWD includes input devices and output devices that provide a user interface to the user. In one implementation, the HMWD may use the computing device to provide access to a wide area network, compute resources, data storage, a display for image output, and so forth.

Among the input devices, the HMWD may include an air conduction (AC) microphone that detects sounds transferred by air, a bone conduction (BC) microphone that detects sounds transferred by another medium such as the head of the user, and so forth. Among the output devices, the HMWD may include a bone conduction speaker (BCS). The BCS comprises an actuator that provides a physical displacement responsive to a drive signal. For example, the BCS may comprise a piezoelectric material that, upon application of a voltage, physically changes shape. In another example, the BCS may comprise an electromagnet that, upon application of a voltage, moves a core. During operation, part of the BCS is in contact with a part of the user's head. As the BCS vibrates responsive to the drive signal, the vibration is mechanically coupled to the user's skull. As a result, the user is able to hear sounds.

Use of the BCS conveys several advantages. The ears of the user remain unobstructed by conventional earphones, providing the user with improved acoustic awareness of their surroundings. By transferring the sound vibrations into the skull of the user, the content of the audio output may be more easily safeguarded to minimize eavesdropping. However, during operation, some of the vibrations produced by the BCS may produce audible sound leakage. For example, at higher amplitude levels of output, the vibrations produced by the BCS may produce sound leakage into the surrounding air.

Sound leakage from the BCS may result in information being audible that the user might otherwise wish to keep private from nearby bystanders. As a result, controlling sound leakage when using a BCS is important for the security of information accessed by the HMWD. Sound leakage may also be deemed a nuisance by bystanders. For example, bystanders may not wish to listen to the audio output.

Described in this disclosure are devices and techniques that utilize active noise cancellation (ANC) to reduce the amplitude of sound that leaks from the BCS. The HMWD may include a first air conduction microphone that is located near the BCS, such as in the temple adjacent to the BCS. The first air conduction microphone may be used to generate reference noise data. This reference noise data is representative of the sound leakage emanating from the BCS. A second air conduction microphone is located at a front bridge on a front frame of the HMWD. For example, when the HMWD is in the form of eyeglasses, the second air conduction microphone may be located on the bridge between the two lenses. The second air conduction microphone may be used to generate error noise data. The error noise data is indicative of the sound leakage that is insufficiently canceled.

An active noise cancellation module utilizes the reference noise data and the error noise data to generate cancellation audio data. Air conduction speaker (ACS) control circuitry is connected to an ACS and uses the cancellation audio data to generate cancellation audio output. The cancellation audio output is 180 degrees out of phase with the sound leakage, and ideally has an amplitude that is equal to that of the sound leakage. When the leaked sound and the cancellation audio output are acoustically combined, the result is a decrease in the amplitude of the leaked sound. Due to a variety of factors, such as changing environmental conditions, the cancellation may not be total and residual sound may be present. The error noise data provides information about this residual sound. The error noise data may be used in a feedback loop by the active noise cancellation module to adapt to changing conditions and minimize the residual sound.

A secondary path exists between the second air conduction microphone used to gather the error noise data and the ACS used to produce the cancellation audio output. This secondary path is also subject to changing conditions. For example, changes in air pressure, humidity, changes to the ACS itself, the second air conduction microphone, and so forth may affect an acoustic signal transferred along this path. In one implementation, the active noise cancellation module may implement a filtered-X least-mean-square (FX-LMS) algorithm. With this algorithm, an estimation of the changes to a signal along this second path are used to filter the reference noise data. The filtered data and the error noise data are then used to determine filter coefficient data. An adaptive filter uses the filter coefficient data to filter the reference noise data and generate the cancellation audio data. In this way, the system is able to more accurately adapt to changing conditions. As a result, the overall performance of the system is improved over a traditional LMS approach.

In other implementations, other active noise cancellation algorithms may be utilized. For example, one or more of a leaky FXLMS algorithm, FBFXLMS algorithm, filtered-U recursive LMS (RLMS) algorithm, and so forth may be utilized to generate the cancellation audio data.

By utilizing the techniques and devices described herein, the HMWD is able to provide audio output using BCS while minimizing sound leakage into the surrounding environment. Privacy of the audio output being presented to the wearer is improved, and disturbance of bystanders is reduced.

Illustrative System

Figure 1:
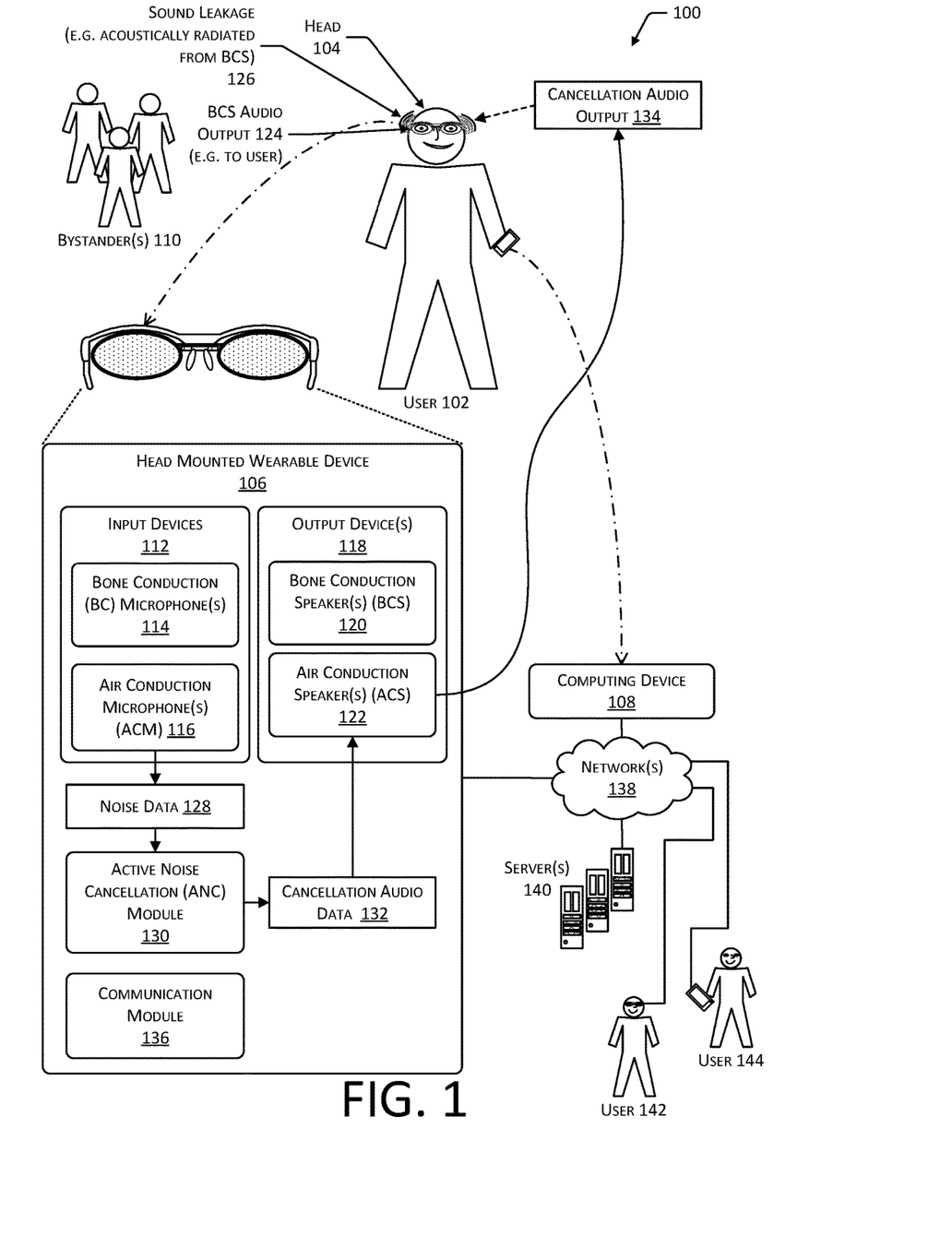
FIG. 1 depicts a system including a head-mounted wearable device equipped with bone conduction speakers (BCS) and an active noise cancellation (ANC) module, according to some implementations.

FIG. 1 depicts a system 100 in which a user 102 is wearing on their head 104 a head-mounted wearable device (HMWD) 106 in a general form factor of eyeglasses. The HMWD 106 may incorporate hinges to allow the temples of the eyeglasses to fold. The HMWD 106 may include one or more lenses. The lenses may be shaped to provide a particular refractive effect on light rays. The lenses may provide other functionality as well. For example, the lenses may act as a surface onto which an image may be presented from an electronic display.

The HMWD 106 may be in communication with one or more affiliated computing devices 108. For example, the HMWD 106 may communicate with the computing device 108 using a personal area network (PAN) such as Bluetooth. The computing device 108 may be used at least in part to provide additional resources, such as access to the network 138, computer resources, storage, display output, and so forth. The computing devices 108 may comprise a smart phone, tablet, local server, in vehicle computer system, and so forth. For example, the computing device 108 may comprise a smart phone that includes a display. The display of the smart phone may be used to present a graphical user interface.

In some situations, there may be bystanders 110 near the HMWD 106. For example, the user 102 wearing the HMWD 106 may be standing in a crowd, sitting on a bus, sitting in an auditorium, walking down a street, and so forth.

The HMWD 106 may include input devices 112. The input devices 112 may comprise one or more of bone conduction microphones (BCM) 114, air conduction microphones (ACM) 116, buttons, touch sensors, and so forth. The BCM 114 may comprise an accelerometer, gyroscope, vibration sensor, and so forth. The ACM 116 may comprise a diaphragm or other elements that move in response to the displacement of air by sound waves.

The HMWD 106 may include one or more output devices 118. The output devices 118 may include a bone conduction speaker (BCS) 120, air conduction speaker (ACS) 122, display lights, and so forth.

During use, the BCS 120, or a portion thereof, is in contact with a portion of the user 102. A movable element of the BCS 120 may be in mechanical contact with the head 104 of the user 102 and produces BCS audio output 124 that is physical displacement or vibrations in the head 104 of the user 102. These vibrations are then perceived as sound by the ear of the user 102. In one implementation, the BCS 120 may comprise a piezoelectric material that, upon application of a voltage, physically changes shape. In another implementation, the BCS 120 may comprise an electromagnet that, upon application of a voltage, moves a core.

In comparison, the ACS 122 is designed to produce vibrations in the surrounding air. For example, the ACS 122 may comprise a diaphragm that is moved to generate sound waves in the air. The ACS 122 may use one or more mechanisms to generate sound waves. These mechanisms may include, but are not limited to: voice coils, piezoelectric elements, metallic ribbon elements, magnetostrictive elements, electrostatic elements, and so forth. The ACS 122 may operate to produce sound between 500 Hertz (Hz) and 20 kHz. For example, the ACS 122 may comprise the Cobra electrodynamic transducer model number 2403-260-0091 from Knowles Electronics, LLC. of Itasca, Ill.

During operation of the BCS 120, some sound leakage may take place. For example, vibrations from the structure holding the BCS 120, vibrations of the users head 104, and so forth may produce sound that is acoustically radiated into the surrounding environment. As a result, the bystanders 110 may be able to hear the sound leakage 126. The ability for bystanders 110 to hear the BCS audio output 124 may result in a breach of privacy for the user 102, disturbance to the bystanders 110, and so forth.

The HMWD 106 acquires noise data 128 from one or more of the ACMs 116. A first ACM 116(1) may be mounted to a front frame of the HMWD 106, such as in a frame bridge. A second ACM 116(2) may be mounted proximate to the BCS 110, such as in a temple of the HMWD 106. The noise data 128 may comprise reference noise data obtained by the second ACM 116(2) and error noise data obtained by the first ACM 116(1). In some implementations, at least a portion of the noise data 128 may be determined from other information. For example, data sent to the BCS 120 for presentation may be used to generate the reference noise data 128.

An active noise cancellation (ANC) module 130 may accept the noise data 128 as input and generate cancellation audio data 132. Active noise cancellation techniques take advantage of the principle of superposition in which sound waves that have an opposite phase and equal amplitudes will produce destructive interference, cancelling one another out. For example, "noise" is any sound deemed unacceptable for operation. The sound leakage 126 is thus considered noise in this situation.

The ANC module 130 uses the noise data 128 to detect the sound leakage 126 and produce the cancellation audio data 132. ACS control circuitry uses the cancellation audio data 132 to produce cancellation audio output 134. The cancellation audio output 134 may also be referred to as a "cancellation sound", "anti-noise", or "anti-sound". In the surrounding air, the sound leakage 126 is combined with the cancellation audio output 134. The cancellation audio output 134 destructively interferes with the sound leakage 126, resulting in a decrease in the apparent amplitude of the sound leakage 126. To the bystander 110, the apparent loudness of the sound leakage 126 is decreased while the ANC module 130 is operating. Additionally, the intelligibility of the sound leakage 126 may be degraded, improving the privacy of the user 102 with respect to any residual sound leakage 126.

In other implementations, other devices may be used to generate the cancellation audio output 134. For example, a second BCS 120 may be used to generate the cancellation audio output 134. In this example, the sound leakage 126 from one BCS 120 may be used to cancel the sound leakage 126 from another.

The ANC module 130 may utilize a variety of techniques to generate the cancellation audio data 132. In one implementation, the ANC module 130 may implement a filtered-X least-mean-square (FXLMS) algorithm. With this algorithm, an estimation of the changes to a signal along a second path between the ACS 122(2) producing the anti-noise and the second or error ACM 116(2) used to generate error noise data. This estimation is used to filter the reference noise data obtained by the first ACM 116(1). The filtered data and the error noise data filter coefficient data. An adaptive filter uses the coefficient data to filter the reference noise data and generate the cancellation audio data 132. In this way, the system is able to accurately adapt to changing conditions and effectiveness of the cancellation of the sound leakage 126 is improved. In other implementations, other techniques may be utilized.

Functions of the ANC module 130 may be performed using one or more of a general purpose processor, digital signal processor (DSP), field programmable gate array (FPGA), dedicated circuitry, and so forth. For example, the ANC module 130 may be implemented using a DSP such as a microcontroller in the TMS320 family from Texas Instruments, Inc. of Dallas, Tex.

The HMWD 106 may also include a communication module 136. The communication module 136 may be configured to establish communication with other devices. The communication module 136 may use one or more communication interfaces to establish communication with the other devices via one or more networks 138. For example, the network 138 may comprise a personal area network, local area network, metropolitan area network, wide area network, and so forth. The HMWD 106 may use the networks 138 to access one or more services that are provided by the other devices. For example, the HMWD 106 may establish communication with one or more servers 140. These one or more servers 140 may provide one or more services, such as automated speech recognition, information retrieval, messaging, and so forth.

The communication module 136 may also be used to establish communications with one or more other users 102. For example, the user 102 of the HMWD 106(1) may initiate a real-time call (RTC) with a user 142 who is also wearing a HMWD 106(2). Audio associated with the RTC may be transferred using the network 138. Management of the call may be facilitated by one or more services executing on the one or more servers 140. The HMWD 106 may also be used to facilitate communication with other devices. For example, the HMWD 106(1) used by the user 102 may be used to establish communication with a user 144 that is using an application executing on a computing device 108(2).

While the HMWD 106 is described in the form factor of eyeglasses, the HMWD 106 may be implemented in other form factors. For example, the HMWD 106 may comprise a device that is worn behind an ear of the user 102, on a headband, as part of a necklace, and so forth. In some implementations, the HMWD 106 may be deployed as a system, comprising several devices that are in communication with one another.

The structures depicted in this and the following figures are not necessarily according to scale. Furthermore, the proportionality of one component to another may change with different implementations. In some illustrations, the size of one structure may be exaggerated with respect to another to facilitate illustration, and not necessarily as a limitation.

The ANC module 130 enables the HMWD to provide audio output using BCS 120 while minimizing sound leakage 126 into the surrounding environment. Privacy of the audio output being presented to the user 102 is improved, and disturbance of bystanders 110 may also be reduced.

Figure 2:
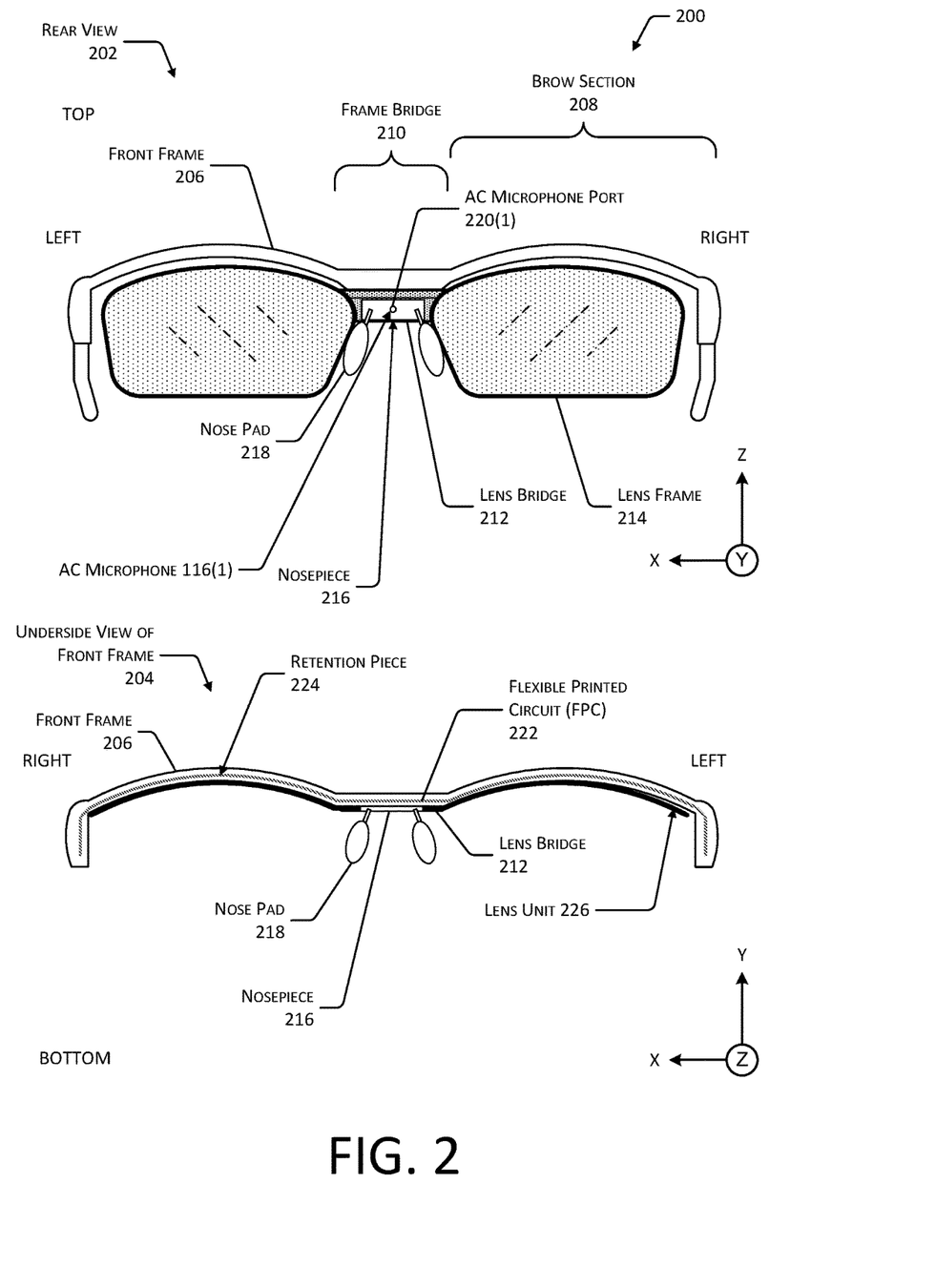
FIG. 2 depicts views of a head-mounted wearable device, according to some implementations.

FIG. 2 depicts views 200 of the HMWD 106, according to one implementation. A rear view 202 shows the exterior appearance of the HMWD 106 while an underside view 204 shows selected components of the HMWD 106.

In the rear view 202, a front frame 206 is depicted. The front frame 206 may include a left brow section 208(L) and a right brow section 208(R) that are joined by a frame bridge 210. In some implementations, the front frame 206 may comprise a single piece of material, such as a metal, plastic, ceramic, composite material, and so forth. For example, the front frame 206 may comprise 6061 aluminum alloy that has been milled to the desired shape. In another example, the front frame 206 may comprise injection molded plastic. In other implementations, the front frame 206 may comprise several discrete pieces that are joined together by way of mechanical engagement features, welding, adhesive, and so forth.

A lens bridge 212 may be located between the left lens (L) and the right lens (R). The lens bridge 212 is depicted here as joining a left lens frame 214 and a right lens frame 214.

The lens bridge 212 may be mounted to the frame bridge 210. A nosepiece 216 may be affixed to the lens bridge 212. One or more nose pads 218 may be affixed to, or integral with, the nosepiece 216. The nose pads 218 aid in the support of the front frame 206 and may improve comfort of the user 102.

The nosepiece 216 may include an air conduction (AC) microphone port 220(1). The AC microphone port 220(1) may comprise a passageway or hole through the nosepiece 216, that allows sound vibrations to be conveyed to an AC microphone 116(1) located within the frame bridge 210.

As described above, the lens frames 214 may be used to retain lenses. The lenses may have specific refractive characteristics, such as in the case of prescription lenses. The lenses may be clear, tinted, photochromic, electrochromic, and so forth. For example, the lenses may comprise plano (non-prescription) tinted lenses to provide protection from the sun. In some implementations, only a single lens may be installed.

The underside view 204 depicts the front frame 206. One or more electrical conductors, optical fibers, transmission lines, and so forth, may be used to connect various components of the HMWD 106. In this illustration, arranged within a channel is a flexible printed circuit (FPC) 222. The FPC 222 allows for an exchange of electrical signals, optical signals, radio signals, power, and so forth, between devices in the HMWD 106. For example, the FPC 222 may be used to provide connections for electrical power and data communications between electronics in one or both of the temples of the HMWD 106.

A retention piece 224 may be placed between the FPC 222 within the channel and the exterior environment. The retention piece 224 may comprise a single piece or several pieces. The retention piece 224 may comprise an overmolded component, a channel seal, a channel cover, and so forth. For example, the material comprising the retention piece 224 may be formed into the channel while in one or more of a powder, liquid or semi-liquid state. The material may subsequently harden into a solid or semi-solid shape. Hardening may occur as a result of time, application of heat, light, electric current, and so forth. In another example, the retention piece 224 may be affixed to the channel or a portion thereof using adhesive, pressure, and so forth. In yet another example, the retention piece 224 may be formed within the channel using an additive technique, such as using an extrusion head to deposit a plastic or resin within the channel, a laser to sinter a powdered material, and so forth. In still another example, the retention piece 224 may comprise a single piece produced using injection molding techniques. In some implementations, the retention piece 224 may comprise an overmolded piece. The FPC 222 may be maintained within the channel by the retention piece 224. The retention piece 224 may also provide devices within the channel with protection from environmental contaminants such as dust, water, and so forth.

The retention piece 224 may be sized to retain the FPC 222 within the channel. The retention piece 224 may include one or more engagement features. The engagement features may be used to facilitate retention of the retention piece 224 within the channel of the front frame 206. For example, the distal ends of the retention piece 224 may include protrusions configured to engage a corresponding groove or receptacle within a portion of the front frame 206. Instead of, or in addition to the engagement features, an adhesive may be used to bond at least a portion of the retention piece 224 to at least a portion of the channel in the front frame 206.

The retention piece 224 may comprise a single material, or a combination of materials. The material may comprise one or more of an elastomer, a polymer, a ceramic, a metal, a composite material, and so forth. The material of the retention piece 224 may be rigid or elastomeric. For example, the retention piece 224 may comprise a metal or a resin. In implementations where the retention piece 224 is rigid, a retention feature such as a tab or slot may be used to maintain the retention piece 224 in place in the channel of the front frame 206. In another example, the retention piece 224 may comprise a silicone plastic, a room temperature vulcanizing rubber, or other elastomer.

A lens unit 226 may comprise one or more of the lens bridge 212, the lens frames 214, the nosepiece 216, the nose pads 218, or the lenses. The lens unit 226 may be joined to the front frame 206. For example, screws may secure the lens bridge 212 to the frame bridge 210.

One or more components of the HMWD 106 may comprise single unitary pieces or may comprise several discrete pieces. For example, the front frame 206, the nosepiece 216, the lens unit 226, and so forth, may comprise a single piece, or may be constructed from several pieces joined or otherwise assembled.

Figure 3:
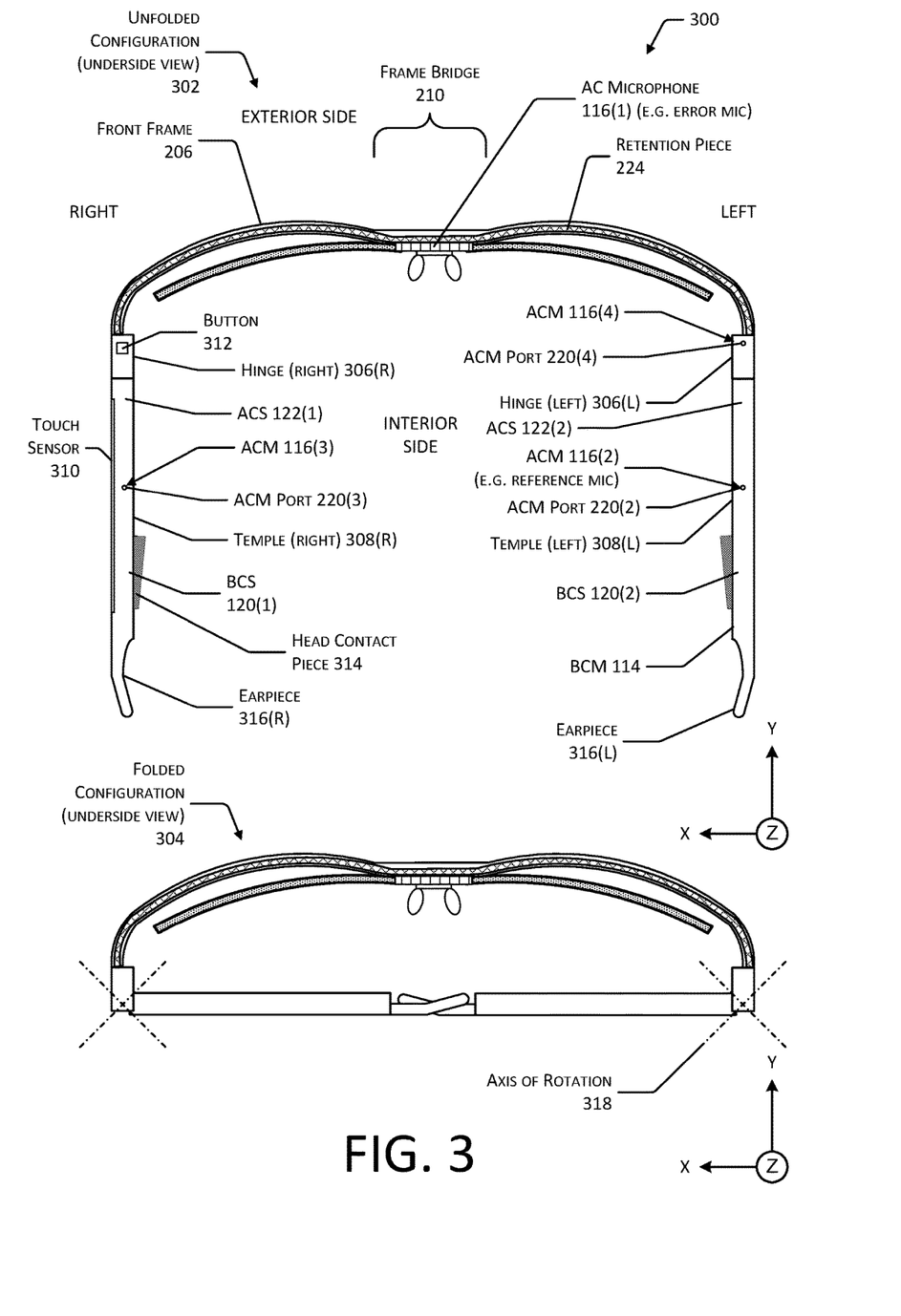
FIG. 3 depicts exterior views, from below, of the head-mounted wearable device in an unfolded and folded configuration, according to some implementations.

FIG. 3 depicts exterior views 300, from below looking up, of the HMWD 106, including a view in an unfolded configuration 302 and a view in a folded configuration 304, according to some implementations. The retention piece 224 that is placed within a channel of the front frame 206 is visible in this view from underneath the HMWD 106.

Also, visible in this view are the lenses of the lens unit 226. Because the lens unit 226 is affixed to the front frame 206 at the frame bridge 210, the front frame 206 may flex without affecting the positioning of the lenses with respect to the eyes of the user 102. For example, when the head 104 of the user 102 is relatively large, the front frame 206 may flex away from the user's head 104 to accommodate the increased distance between the temples. Similarly, when the head 104 of the user 102 is relatively small, the front frame 206 may flex towards the user's head 104 to accommodate the decreased distance between the temples.

One or more hinges 306 may be affixed to, or an integral part of, the front frame 206. Depicted are a left hinge 306(L) and a right hinge 306(R) on the left and right sides of the front frame 206, respectively. The left hinge 306(L) is arranged at the left brow section 208(L), distal to the frame bridge 210. The right hinge 306(R) is arranged at the right brow section 208(R) distal to the frame bridge 210.

A temple 308 may couple to a portion of the hinge 306. For example, the temple 308 may comprise one or more components, such as a knuckle, that mechanically engage one or more corresponding structures on the hinge 306.

The left temple 308(L) is attached to the left hinge 306(L) of the front frame 206. The right temple 308(R) is attached to the right hinge 306(R) of the front frame 206.

The hinge 306 permits rotation of the temple 308 with respect to the hinge 306 about an axis of rotation 318. The hinge 306 may be configured to provide a desired angle of rotation. For example, the hinge 306 may allow for a rotation of between 0 and 120 degrees. As a result of this rotation, the HMWD 106 may be placed into a folded configuration, such as shown at 304. For example, each of the hinges 306 may rotate by about 90 degrees, such as depicted in the folded configuration 304.

One or more of the front frame 206, the hinge 306, or the temple 308 may be configured to dampen the transfer of vibrations between the front frame 206 and the temples 308. For example, the hinge 306 may incorporate vibration damping structures or materials to attenuate the propagation of vibrations between the front frame 206 and the temples 308. These vibration damping structures may include elastomeric materials, springs, and so forth. In another example, the portion of the temple 308 that connects to the hinge 306 may comprise an elastomeric material.

One or more different sensors may be placed on the HMWD 106. For example, a first AC microphone 116(1) may be located at the frame bridge 210, while a second ACM 116(2) is located in the left temple 308(L), a third ACM 116(3) is located in the right temple 308(R), and so forth. In another example, an ACM 116(4) may be located within or proximate to the left hinge 306(L), such as on the underside of the left hinge 306(L). These components are maintained at a fixed distance relative to one another during operation.

For example, the relatively rigid frame of the HMWD 106 maintains the spacing between the ACM 116 and the ACS 122(1) and ACS 122(2).

The ACMs 116 may have corresponding ACM ports 220. For example, the ACM 116(2) may have an ACM port 220(2) that provides a passageway between the exterior environment and the ACM 116(2).

The HMWD 106 may include one or more ACS 122. For example, a first ACS 122(2) is located in the left temple 308(L) and a second ACS 122(1) is located in the right temple 308(R). The ACS 122 may have a speaker opening (not shown) that allows sound to be transferred from the ACS 122 to the surrounding environment. The speaker opening may comprise one or more holes that provide a passageway or hole through an exterior housing to the exterior environment. In some implementations, the speaker opening may be covered or filled with a grill, mesh, fabric, elastomeric material, and so forth.

The ACM 116 may comprise a diaphragm, microelectromechanical system (MEMS) element, or other elements that move in response to the displacement of air by sound waves. Data produced by the ACM 116 may be generated that is indicative of the sound detected by the ACM 116. For example, the noise data 128 may comprise data generated by one or more ACMs 116.

As described above, the BCM 114 is responsive to the vibrations produced by the user 102, such as while speaking. The BCM 114 may be arranged to be in contact with the skin above a bony or cartilaginous structure. For example, where the HMWD 106 is in the form of eyeglasses, nose pads 218 of a nosepiece 216 may be mechanically coupled to the BCM 114 such that vibrations of the nasal bone, glabella, or other structures upon which the nose pads 218 may rest are transmitted to the BCM 114. In other implementations, the BCM 114 may be located elsewhere with respect to the HMWD 106 or worn elsewhere by the user 102. For example, the BCM 114 may be incorporated into the temple 308 of the HMWD 106, a hat or headband.

A touch sensor 310 may be located on one or more of the temples 308. For example, the touch sensor 310 may comprise a capacitive touch sensor, a force sensitive resistor touch sensor, an optical touch sensor, and so forth. Touch sensor data may be generated that is indicative of the location, direction, duration and so forth of the touch.

One or more buttons 312 may be placed in other locations on the HMWD 106. For example, a button 312 may be emplaced within, or proximate to, the right hinge 306(R), such as on an underside of the right hinge 306(R).

One or more bone conduction speakers (BCS) 120 may be emplaced on the temples 308. For example, as depicted here, a BCS 120 may be located on the surface of the temple 308 that is proximate to the head 104 of the user 102 during use. In some implementations, the BCS 120 may be used to provide the functionality of the BCM 114. For example, the BCS 120 may be used to detect vibrations of the user's 102 head 104.

The ACS 122 may be mounted in the same temple 308 as the BCS 120. For example, as shown here the left temple 308(L) includes the BCS 120(2) and the ACS 122(2). This positioning may improve performance of the active noise cancellation by placing the source of the noise, that is the BCS 120(2) near the source of the anti-noise, that is the ACS 122(2).

The ACM 116 may be mounted in the same temple 308 as the BCS 120. For example, as shown here the left temple 308(L) includes the BCS 120(2) and the ACM 116(2) that is proximate thereto. Proximity between the BCS 120 and an ACM 116 may improve the quality of the reference noise data acquired by the ACM 116.

A head contact piece 314 may be affixed to, or part of, the BCS 120. The BCS 120 provides best performance when there is sufficient mechanical coupling with a portion of the head 104 of the user 102. However, different users 102 may exhibit different head 104 shapes. To improve mechanical coupling between the BCS 120 and different head 104 shapes, a head contact piece 314 may be affixed to the BCS 120. In one implementation, the head contact piece 314 may be wedge shaped, having a thicker end and tapering to a thinner end. The thickest part of the wedge may be positioned towards the front of the BCS 120, closest to the front of the HMWD 106. In other implementations, the head contact piece 314 may exhibit other shapes. For example, the head contact piece 314 may be concave.

The head contact piece 314 may be removeable or adjustable to accommodate different shapes of head 104. For example, magnets may be used to join the head contact piece 314 to the BCS 120. In another example, one or more of the BCS 120 or the head contact piece 314 may include a magnetically receptive material that is attracted to magnets on the opposing structure.

The head contact piece 314 may comprise an elastomeric material that conforms at least partially to the contour of the head 104. For example, the head contact piece 314 may comprise one or more thermoplastic elastomers exhibiting a Shore hardness of 40A. In other implementations, the head contact piece 314 may comprise a rigid material, or a combination of soft and hard materials. For example, a rigid inner component may be coated with an elastomer.

An earpiece 316 may extend from a portion of the temple 308 that is distal to the front frame 206. The earpiece 316 may comprise a material that may be reshaped to accommodate the anatomy of the head 104 of the user 102. For example, the earpiece 316 may comprise a thermoplastic that may be warmed to a predetermined temperature and reshaped. In another example, the earpiece 316 may comprise a wire that may be bent to fit. The wire may be encased in an elastomeric material.

Figure 4:
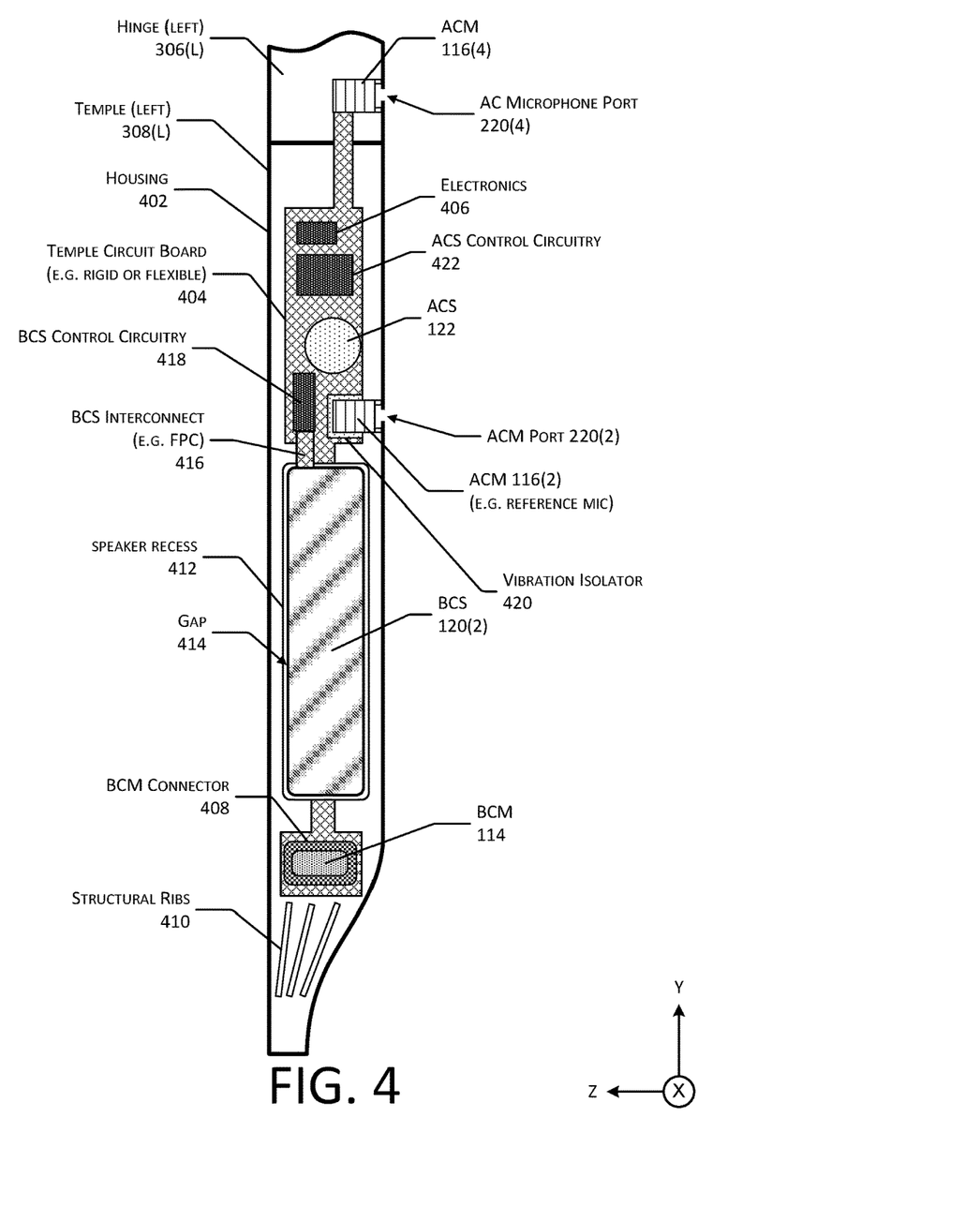
FIG. 4 depicts some of the internal components of a temple of a head-mounted wearable device including a BCS, according to some implementations.

FIG. 4 depicts 400 some of the internal components of a left temple 308(L) of a HMWD 106 including a BCS 120 and ACS 122, according to some implementations. The depiction of the left temple 308(L) is provided by way of example and not necessarily as a limitation. For example, the same or similar structures as described herein may be installed in the right temple 308(R).

A portion of the hinge 306 is depicted. Arranged within the hinge 306 is an ACM 116(4). An AC microphone port 220(4) for the ACM 116 in the hinge 306 is depicted. The AC microphone port 220(4) may open generally downwards. For example, the aperture of the AC microphone port 220(4) may be on a bottom surface of the hinge 306 and may open towards the feet of the user 102 during normal wear.

As described above, the hinge 306 is coupled to a temple 308. The temple 308 may comprise a housing 402. The housing 402 may comprise one or more elements that serve to enclose at least a portion of the temple 308. The housing 402 may comprise a plastic, metal, ceramic, composite material, and so forth.

A temple circuit board 404 is depicted. The temple circuit board 404 may comprise a rigid or flexible circuit board. For example, the temple circuit board 404 may comprise a flexible printed circuit. In some implementations, the temple circuit board 404 may extend at least partially into the hinge 306. For example, the ACM 116 may be connected to the temple circuit board 404.

Electronics 406 may be connected to, affixed to, or otherwise in communication with the temple circuit board 404. For example, integrated circuits may be laminated to the temple circuit board 404.

A BC microphone connector 408 may be affixed to the temple circuit board 404. For example, a pressure sensitive adhesive (PSA) may be used to join the temple circuit board 404 and the BC microphone connector 408. In some implementations, the BC microphone connector 408 may comprise a flexible or elastomeric material into which the BCM 114 may be emplaced. In the implementation depicted here, the BCM 114 is located proximate to the distal end of the temple 308 and is thus closer to the earpiece 316 than the BCS 120.

Depicted in this illustration are structural ribs 410. The structural ribs 410 may be used to add rigidity to a distal portion of the temple 308. The structural ribs 410 may also improve structural support for the earpiece 316 (not shown).

Also depicted is a BCS 120. The BCS 120 may be emplaced at least partially within a speaker recess 412. The speaker recess 412 extends within the housing 402 of the temple 308. When mounted within the speaker recess 412, the BCS 120 is affixed to a bottom of the speaker recess 412 and a gap 414 around a perimeter of the BCS 120 and one or more walls of the speaker recess 412 is maintained. By providing this mechanical separation from the sides of the BCS 120 and the housing 402, attenuation due to mechanical coupling between the housing 402 and the BCS 120 is minimized. As a result, output amplitude is increased, providing a greater range of available volume for the user 102.

The BCS 120 is connected via a BCS interconnect 416 to BCS control circuitry 418. The BCS interconnect 416 may comprise a flexible printed circuit 222, wiring harness, and so forth to provide an electrical connection between the BCS 120 and the control circuitry 418. In some implementations, the BCS interconnect 416 may span the gap 414. In other implementations, the BCS interconnect 416 may comprise circuit traces arranged on the bottom of the speaker recess 412, and the bottom of the BCS 120 may utilize corresponding conductive pads to establish an electrical connection.

The BCS control circuitry 418 accepts BCS output data as input and generates a drive signal. For example, the BCS control circuitry 418 may comprise a digital to analog converter (DAC) and a power amplifier. The DAC converts the BCS output data to an analog signal, which may then be amplified using the power amplifier to produce the drive signal. The drive signal is then provided to the BCS 120 which vibrates to produce the BCS audio output 124. As described above, some sound leakage 126 may be produced in the form of sound acoustically radiated by the BCS 120 or structures attached thereto.

An ACM 116(2) with a corresponding ACM port 220(2) is positioned proximate to the BCS 120. The ACM 116(2) may provide reference noise data to the ANC module 130. In some implementations, a vibration isolator 420 may be used to provide some attenuation of mechanical vibration between the temple circuit board 404 and the ACM 116(2). For example, the vibration isolator 420 may comprise an elastomeric material such as a viscoelastic foam, acoustic foam, and so forth. In another example, the vibration isolator 420 may comprise a flexible member such as a living hinge, pleated material, flexible printed circuit board 222, and so forth. By attenuating the transfer of the mechanical vibration from the BCS 120 to the ACM 116(2), the reference noise data may be less noisy and more representative of the sound leakage 126. As a result, performance of the ANC module 130 may be improved, resulting in less residual sound leakage 126.

The temple 308 may include one or more ACS 122. For example, the ACS 122 may be affixed or otherwise coupled to the temple circuit board 404. The ACS 122 may be configured with one or more ports to allow the transfer of sound produced by the ACS 122 to the environment outside of the housing 402. For example, the one or more ports of the ACS 122 may be arranged along a bottom of the temple 308, an interior side of the temple 308, an exterior side of the temple 308, a top of the temple 308, and so forth. In another example, the ACS 122 may be surface mounted on an outer surface of the housing 402.

The ACS control circuitry 422 accepts cancellation audio data 132 as input and generates a drive signal. For example, the ACS control circuitry 422 may comprise a DAC and a power amplifier. The DAC converts the cancellation audio data 132 to an analog signal, which may then be amplified using the power amplifier to produce the drive signal. The drive signal is then provided to the ACS 122 which produces the cancellation audio output 134.

In other implementations, the ACS control circuitry 422 and the ACS 122 may be used to produce other audio output. For example, audio presentation to the user 102 may be made using the ACS 122 instead of, or in addition to, the BCS 120.

Figure 5:
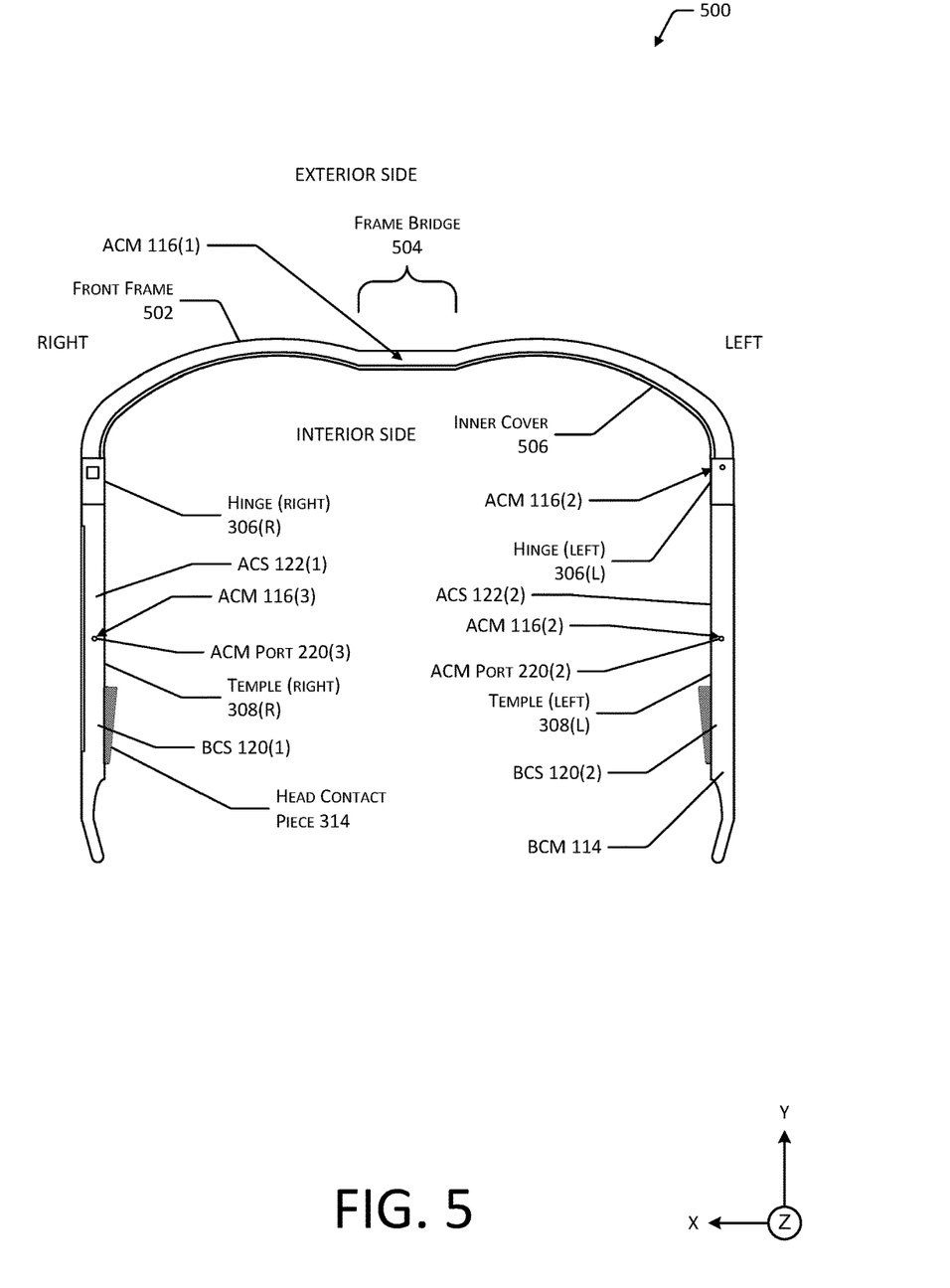
FIG. 5 depicts an exterior view, from below, of the head-mounted wearable device in an unfolded configuration that utilizes an inner cover, according to some implementations.

FIG. 5 depicts an exterior view 500, from below, of the HMWD 106 in an unfolded configuration that utilizes an inner cover, according to another implementation. In this implementation, the HMWD 106 may utilize a front frame 502 that provides integral support for one or more of the lenses. Similar to the front frame 206 described above, the front frame 502 may include a frame bridge 504 that joins a left brow section and a right brow section.

The front frame 502 may have an interior side that is proximate to the user 102 during normal wear, and an exterior side that is opposite the interior side. The interior side of the front frame 502 may be open, allowing for the assembly of the HMWD 106 by insertion of the FPC 222, sensors such as the ACM 116, and so forth within the front frame 502. Once ready for final assembly, an inner cover 506 may be joined to the interior side of the front frame 502. The inner cover 506 provides concealment and protection for the structures and components within the front frame 502.

Similar to that described above with regard to FIG. 3, the temples 308 may include one or more of BCSs 120, ACMs 116, ACS 122, and so forth. Head contact pieces 314 may be utilized to improve fit of the BCS 120 to a particular user 102.

Figure 6:
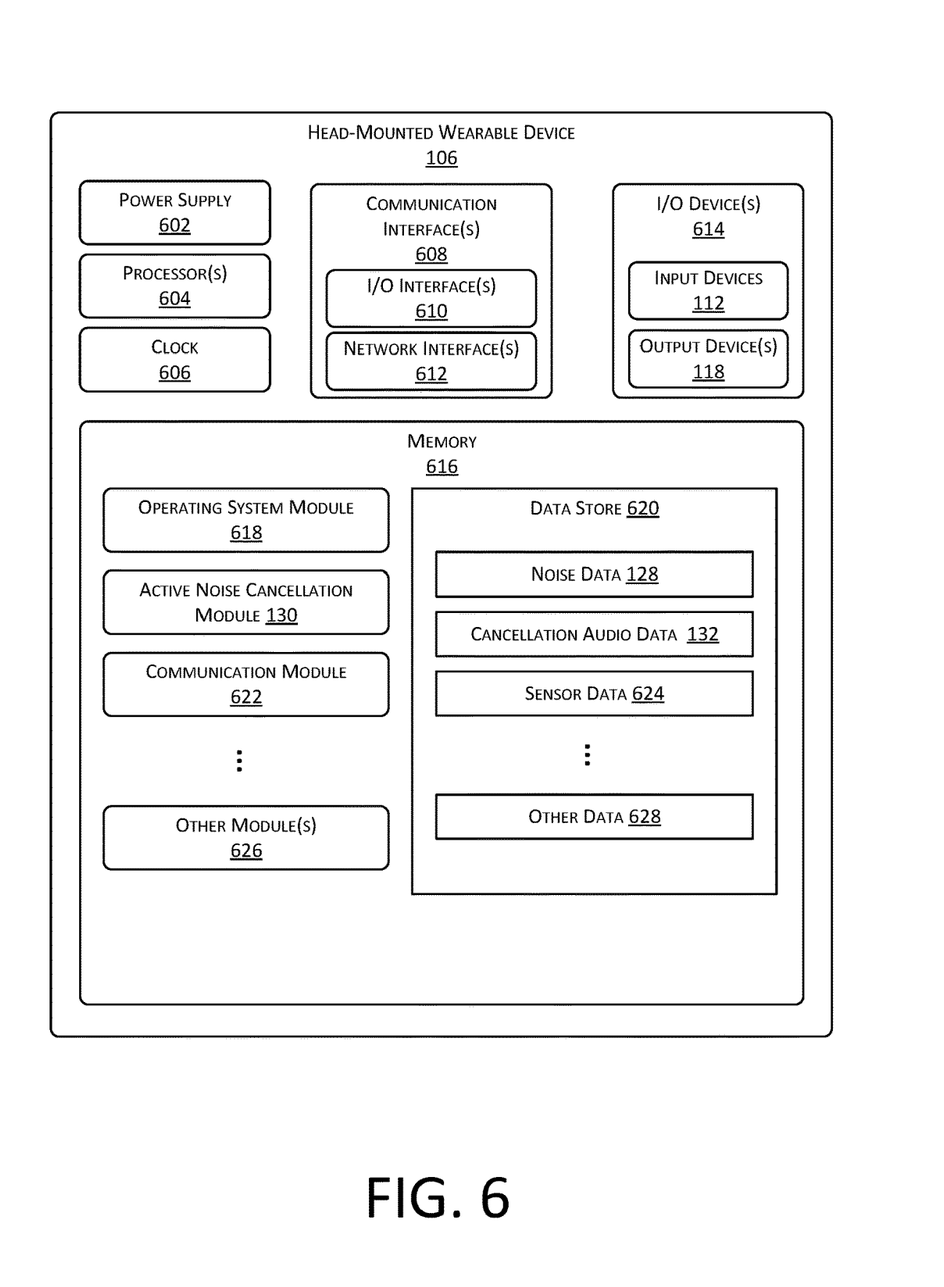
FIG. 6 is a block diagram of electronic components of the head-mounted wearable device, according to some implementations.

FIG. 6 is a block diagram 600 of components of the head-mounted wearable device 106, according to some implementations.

One or more power supplies 602 may be configured to provide electrical power suitable for operating the components in the HMWD 106. The one or more power supplies 602 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive or capacitive power transfer. In another implementation, electrical contacts may be used to recharge the HMWD 106.

The HMWD 106 may include one or more hardware processors 604 (processors) configured to execute one or more stored instructions. The processors 604 may comprise one or more cores. The processors 604 may include general purpose microprocessors, microcontrollers, application specific integrated circuits (ASICs), digital signal processors (DSPs), and so forth. One or more clocks 606 may provide information indicative of date, time, ticks, and so forth. For example, the processor 604 may use data from the clock 606 to associate a particular interaction with a particular point in time.

The HMWD 106 may include one or more communication interfaces 608 such as input/output (I/O) interfaces 610, network interfaces 612, and so forth. The communication interfaces 608 enable the HMWD 106, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices 112. The input devices 112 may include but are not limited to, the BCM 114, the ACM 116, the touch sensor 310, the button 312, a camera, a proximity sensor, a barometer, a light sensor, an inertial measurement unit, a magnetometer, and so forth. The I/O devices 614 may also include output devices 118. The output devices 118 may include but are not limited to display lights, graphical displays, BCSs 120, ACSs 122, haptic output devices, and so forth. The display lights may comprise one or more light-emitting diodes, quantum dots, incandescent lamps, electroluminescent materials, and so forth. When activated, a display light emits light. One or more display lights may be positioned within the field of view of the user 102 while the HMWD 106 is worn on the head 104. For example, one or more display lights may be arranged just above one or both lenses of the HMWD 106, such as on the front frame 206 or the front frame 502.

In some embodiments, the I/O devices 614 may be physically incorporated with the HMWD 106 or may be externally placed. The output devices 118 are configured to generate signals, which may be perceived by the user 102 or may be detected by input devices 112.

The network interfaces 612 may be configured to provide communications between the HMWD 106 and other devices, such as the server 140. The network interfaces 612 may include devices configured to couple to personal area networks (PANs), wired or wireless local area networks (LANs), wide area networks (WANs), and so forth. For example, the network interfaces 612 may include devices compatible with Ethernet, Wi-Fi, Bluetooth, Bluetooth Low Energy, ZigBee, and so forth.

The HMWD 106 may also include one or more busses or other internal communications hardware or software that allow for the transfer of data between the various modules and components of the HMWD 106.

As shown in FIG. 6, the HMWD 106 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the HMWD 106. A few examples of functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including servers 140, network attached storage devices, and so forth.

The ANC module 130 may be configured to process the noise data 128 acquired by the ACS 122 and generate the cancellation audio data 132. Operation of the ANC module 130 is discussed below in more detail with regard to FIG. 7.

The memory 616 may store a communication module 622 that is configured to establish communications with one or more of the computing devices 108, other HMWDs 106, servers 140, input devices 112, or other devices. The communications may be authenticated, encrypted, and so forth.

During operation of the system, the memory 616 may store sensor data 624 or other data 628 at least temporarily, in the data store 620. Other modules 626 may also be present in the memory 616 as well as other data 628 in the data store 620. For example, the other modules 626 may include a contact management module while the other data 628 may include address information associated with a particular contact, such as an email address, telephone number, network address, uniform resource locator, and so forth.

Figure 7:
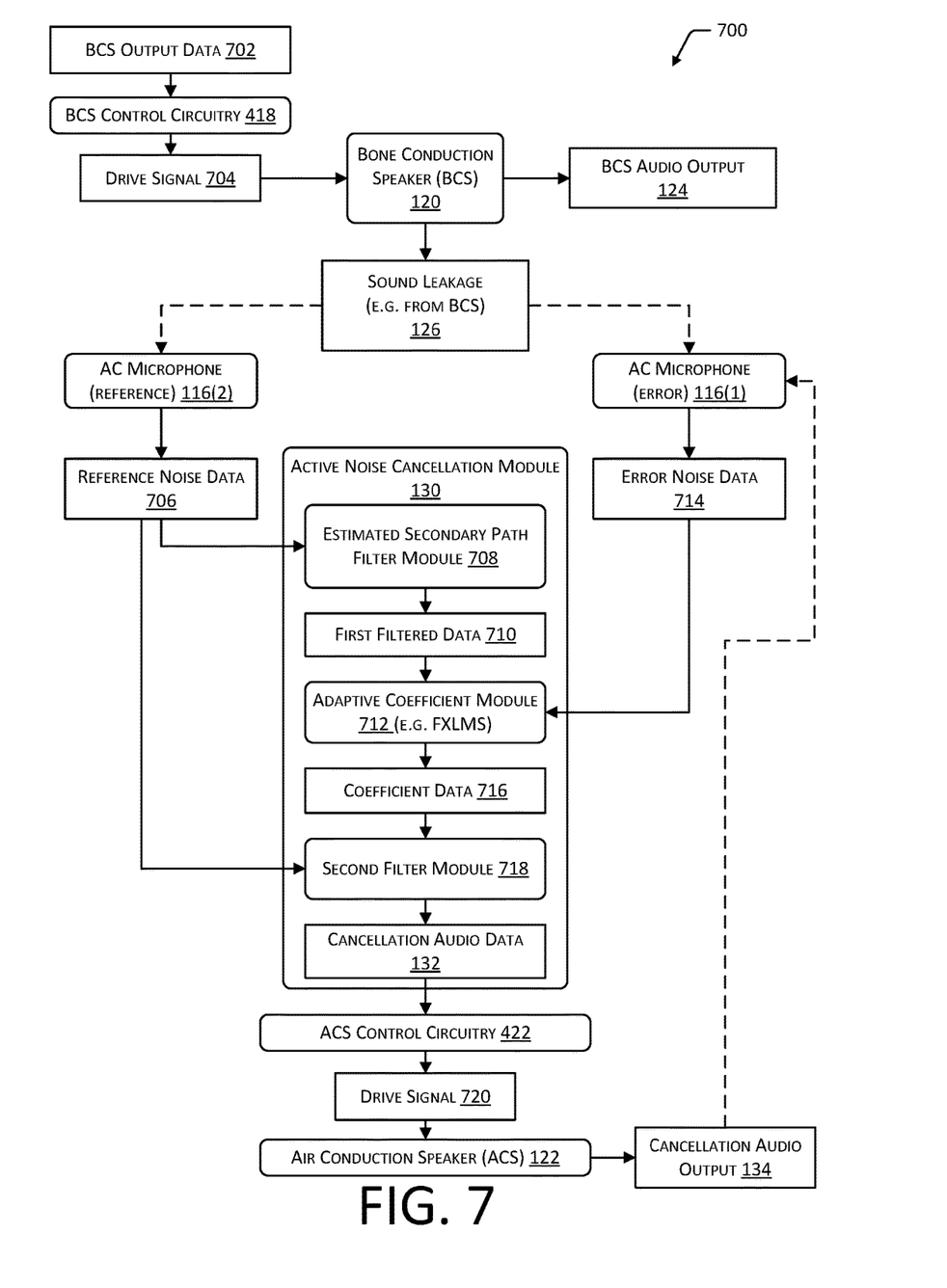
FIG. 7 is a block diagram of an active noise cancellation module and associated inputs and outputs, according to some implementations.

FIG. 7 is a block diagram 700 of the ANC module 130 and associated inputs and outputs, according to some implementations. One or more of the functions associated with the ANC module 130 may be performed by one or more of a general purpose processor, digital signal processor (DSP), field programmable gate array (FPGA), dedicated circuitry, and so forth.

The OS module 618 or an application may provide BCS output data 702 that is intended for presentation using the BCS 120. For example, a telephony application may provide BCS output data 702 that is representative of speech from another person the user 102 is communicating with via the HMWD 106.

The BCS control circuitry 418 uses the BCS output data 702 as input and generates a drive signal 704. For example, the BCS output data 702 may comprise a digitized representation of sound while the drive signal 704 comprises an analog time-varying electrical signal. The drive signal 704 is provided to the BCS 120, such as via electrical conductors. The drive signal 704 produces motion in the BCS speaker 120 that produces the BCS audio output 124 in the form of physical displacement or vibration in the head 104 of the user 102. Some sound leakage 126 may occur during operation of the BCS 120. For example, some of the motion in the BCS speaker 120 mounted to the temple 308 may be transferred to the temple 308, producing vibration in the temple 308 or associated structures such as an external housing 402, that in turn displaces air in the environment, producing sound leakage 126.

An ACM 116 produces reference noise data 706. For example, the ACM 116(2) that is mounted proximate to the BCS 120(2) may be used to generate the reference noise data 706. The reference noise data 706 is indicative of the acoustic output produced during operation of the BCS 120. The physical path length between the ACM 116(2) that provides the reference noise data 706 and the BCS 120 is shorter than the physical path length between the ACM 116(1) that provides the error noise data 714 and the BCS 120. As a result, the reference noise data 706 is more representative of the sound leakage 126 while the error noise data 714 is more representative of the superposition of the sound leakage 126 and the cancellation audio output 134. The secondary path between the ACS 122 to the ACM 116(1) is shown.

In another implementation, the reference noise data 706 may be produced by the BCM 114. For example, instead of, or in addition to, using the ACM 116(2), the BCM 114 may be used to acquire the reference noise data 706. In yet another implementation, the reference noise data 706 may be generated based at least in part on the BCS output data 702. For example, the reference ACM 116 may be omitted, or not used. Continuing the example, a transform function may be used to produce simulated reference noise data 706 based on the BCS output data 702. The transform function may account for an estimated or measured variance between the BCS output data 702 and the actual sound leakage 126. In some implementations, the transform function may be generated using data obtained through simulation or experimentally.

In the implementation depicted here, the ANC module 130 may implement a filtered-X least-mean-square (FX-LMS) algorithm. With this algorithm, the reference noise data 706 is first processed by an estimated secondary path filter module 708. The estimated secondary path filter module 708 provides as an output first filtered data 710 that is an estimation of the changes to a signal along a second path between the ACS 122(2) and the second ACM 116(1) that is used to generate error noise data 714. The primary path is from the BCS 120, the noise source, to the ACM 116(1) used to acquire the error noise data 714. The secondary path is from the ACS 122 to the ACM 116(1) used to gather the error noise data 714. Because of physical differences in the path length, different processing latencies, and so forth, the primary path and the secondary path differ. The mixing between the cancellation audio output 134 and the sound leakage 126 takes place away from the HMWD 106, and thus those signals may be out of phase with one another. To minimize or avoid distortion, the secondary path length is considered when using the FXLMS algorithm. In some implementations, the estimated secondary path filter module 708 may utilize a predetermined transform or matrix. For example, the estimated secondary path filter module 708 may impose a specific delay to the reference noise data 706 to account for those differences in phase. In other implementations, other algorithms may be used to generate the cancellation audio data 132.

In some implementations, the cancellation audio data 132 may exhibit frequencies of between 1 kHz and 6 kHz. For example, some implementations of BCS 120 may exhibit sound leakage 126 at particular frequencies or frequency bands. The ANC module 130 may be configured to produce cancellation audio output 134 within a desired range of frequencies.

An adaptive coefficient module 712 may accept as input the first filtered data 710 and error noise data 714. In the implementation depicted here, the adaptive coefficient module 712 may implement a filtered-X least-mean-square (FX-LMS) algorithm. The adaptive coefficient module 712 processes the first filtered data 710 and the error noise data 714 to produce coefficient data 716. The coefficient data 716 is indicative of coefficients or weights that may subsequently be used by a second filter module 718.

The second filter module 718 processes the reference noise data 706 using the coefficient data 716 to generate cancellation audio data 132. The cancellation audio data 132 is representative of a waveform that is estimated by the ANC module 130 to be 180 degrees out of phase with the sound leakage 126.

The cancellation audio data 132 is sent to the ACS control circuitry 422. Based on the cancellation audio data 132, the ACS control circuitry 422 generates a drive signal 720. For example, the cancellation audio data 132 may comprise a digitized representation of sound while the drive signal 720 comprises an analog time-varying electrical signal. The drive signal 720 is provided to the ACS 122, such as via electrical conductors. The drive signal 720 drives the ACS 122 to produce the cancellation audio output 134.

The ANC module 130 as described above may thus operate in a dynamic loop with feedback, with input from the error ACM 116(1) being used to adapt operation to changing conditions. As a result, the performance of the ANC module 130 is improved relative to static noise cancellation.

While FXLMS is described, other algorithms may be used instead of, or in addition to, FXLMS. For example, one or more of a leaky FXLMS algorithm, FBFXLMS algorithm, filtered-U recursive LMS (RLMS) algorithm, and so forth may be utilized to generate the cancellation audio data 132.

In some implementations, a separate ANC module 130 may be used for each BCS 120. For example, a first ANC module 130(1) may be used to provide cancellation audio data 132(1) for the BCS 120(2) on the left of the HMWD 106 while a second ANC module 130(2) may be used to provide cancellation audio data 132(2) for the BCS 120(1) on the right side of the HMWD 106. In another implementation, a single ANC module 130 capable of generating left and right channels of cancellation audio data 132 may be utilized. In these implementations, each channel of cancellation audio data 132 may be generated using error noise data 714 from the AC microphone 116(1) and reference noise data 706 acquired using the respective ACM 116(2) on that side of the HMWD 106.

Additional details regarding active noise cancellation may be found in "Active Noise Control: A Tutorial Review" by Sen M. Kuo and Dennis R. Morgan, Proceedings of the IEEE v. 87, no. 6, June, 1999, Pages 943-973, and "Design of Active Noise Control Systems with the TMS320 Family" by Sen M. Kuo, et. al, published by Texas Instruments, Inc., Digital Signal Processing Products—Semiconductor Group, SPRA042, June 1996, 171 pages.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A head-mounted wearable device comprising:
   a front frame comprising:
      a frame bridge;
      a first air conduction microphone mounted proximate to the frame bridge;
      a first hinge and a second hinge;
   a first temple connected to the first hinge, wherein the first temple comprises:
      a bone conduction speaker (BCS);
      an air conduction speaker (ACS);
      a second air conduction microphone mounted proximate to the BCS;
   a second temple connected to the second hinge;
   BCS control circuitry connected to the BCS that is configurable to provide a first signal to the BCS that will present audio output based on the first signal;
   ACS control circuitry connected to the ACS that is configurable to provide a second signal to the ACS that will present audio output based on the second signal;
   one or more memories storing computer-executable instructions; and
   one or more hardware processors to execute the computer-executable instructions to:
      access output data representative of audio to be presented;
      operate the BCS control circuitry to generate BCS audio output from the output data using the BCS;
      acquire reference noise data using the second air conduction microphone;
      acquire error noise data using the first air conduction microphone;
      generate cancellation audio data based on the reference noise data and the error noise data; and
      send the cancellation audio data to the ACS control circuitry to generate cancellation audio output, wherein the cancellation audio output produces destructive acoustic interference with sound acoustically radiated by the BCS.

2. The head-mounted wearable device of claim 1, the instructions to generate the cancellation audio data further comprising computer-executable instructions to:
   process the reference noise data using an estimated secondary path function to generate first filtered data;
   generate coefficient data using a filtered-x least mean square (FXLMS) function with the first filtered data and the error noise data as inputs; and
   process the reference noise data using a filter function configured with the coefficient data to generate the cancellation audio data.

3. A head-mounted wearable device comprising:
   a first air conduction microphone mounted to a structure;
   a bone conduction speaker (BCS) mounted to the structure;
   an air conduction speaker (ACS) mounted to the structure;
   BCS control circuitry connected to the BCS that is configurable to provide a first signal to the BCS that will present BCS audio output based on the first signal;
   ACS control circuitry connected to the ACS that is configurable to provide a second signal to the ACS that will present ACS audio output based on the second signal;
   one or more memories storing computer-executable instructions; and
   one or more hardware processors to execute the computer-executable instructions to:
      access output data representative of audio to be presented;
      operate the BCS control circuitry using the output data to generate BCS audio output using the BCS;
      acquire noise data using at least the first air conduction microphone;
      generate cancellation audio data based on the noise data; and
      operate the ACS control circuitry using the cancellation audio data to generate ACS audio output using the ACS, wherein the ACS audio output produces destructive acoustic interference with sound acoustically radiated by the BCS.

4. The head-mounted wearable device of claim 3, further comprising:
   a vibration isolator between the structure and the first air conduction microphone, wherein the vibration isolator comprises one or more of an elastomeric material or a flexible member to attenuate motion between the structure and the first air conduction microphone.

5. The head-mounted wearable device of claim 3, wherein the structure comprises:
   a front frame having a hinge;
   a temple attached to the front frame via the hinge; and
   wherein the first air conduction microphone is mounted to the front frame, the BCS is mounted to the temple, and the ACS is mounted to the temple.

6. The head-mounted wearable device of claim 3, wherein the structure comprises:

a front frame having a hinge;
a temple attached to the front frame via the hinge; and
wherein the first air conduction microphone is mounted to the temple, the BCS is mounted to the temple, and the ACS is mounted to the temple.

7. The head-mounted wearable device of claim 3, wherein the structure comprises:
a front frame having a hinge;
a temple attached to the front frame via the hinge; and
wherein the first air conduction microphone is mounted to the front frame; and
further comprising:
a second air conduction microphone mounted to the temple;
wherein the noise data comprises first microphone data and second microphone data;
the one or more memories storing second computer-executable instructions; and
further comprising the one or more hardware processors to execute the second computer executable instructions to:
acquire the first microphone data using the first air conduction microphone; and
acquire the second microphone data using the second air conduction microphone.

8. The head-mounted wearable device of claim 3, wherein the first air conduction microphone is mounted proximate to the BCS; and
further comprising:
a second air conduction microphone mounted to the structure, distal to the BCS; and
wherein the noise data further comprises:
reference noise data obtained using the first air conduction microphone; and
error noise data obtained using the second air conduction microphone.

9. The head-mounted wearable device of claim 3, wherein the cancellation audio data is representative of the first signal that is out of phase with the second signal that is represented by the noise data.

10. The head-mounted wearable device of claim 8, the instructions to generate the cancellation audio data further comprising computer-executable instructions to:
process the reference noise data using an estimated secondary path function to generate first filtered data;
generate coefficient data using a filtered-x least mean square (FXLMS) function with the first filtered data and the error noise data as inputs; and
process the reference noise data using a filter function configured with the coefficient data to generate the cancellation audio data.

11. The head-mounted wearable device of claim 3, further comprising:
the one or more memories storing second computer-executable instructions; and
the one or more hardware processors to execute the second computer executable instructions to:
access the output data; and
apply one or more transform functions to the output data to generate reference noise data; and
generate the cancellation audio data based on the reference noise data.

12. The head-mounted wearable device of claim 3, wherein the ACS audio output exhibits frequencies between 1 kilohertz and 6 kilohertz.

13. The head-mounted wearable device of claim 3, wherein the ACS comprises one or more of: a voice coil, a piezoelectric element, an electrostatic element, a metallic ribbon element, or a magnetostrictive element that is configurable to generate sound with a minimum frequency of 500 Hertz.

14. The head-mounted wearable device of claim 3, further comprising:
a speaker opening proximate to the ACS, the speaker opening comprising a passageway or hole through an exterior housing, wherein the speaker opening is on an exterior side of the housing.

15. The head-mounted wearable device of claim 3, wherein the first air conduction microphone is mounted distal to the BCS; and
further comprising:
a bone conduction microphone mounted to the structure proximate to the BCS;
wherein the noise data further comprises:
error noise data obtained using the first air conduction microphone; and
reference noise data obtained using the bone conduction microphone; and
the instructions to generate the cancellation audio data further comprise computer-executable instructions to:
process the reference noise data using an estimated secondary path function to generate first filtered data;
generate coefficient data using a filtered-x least mean square (FXLMS) function with the first filtered data and the error noise data as inputs; and
process the reference noise data with a filter function configured with the coefficient data to generate the cancellation audio data.

16. A method comprising:
generating, using output data indicative of audio to be presented, output from a bone conduction speaker (BCS), wherein the output includes acoustically radiated sound;
acquiring noise data indicative of the acoustically radiated sound from the BCS;
generating, using the noise data, cancellation audio data; and
generating, using the cancellation audio data, cancellation audio output using an air conduction speaker (ACS).

17. The method of claim 16, the acquiring the noise data comprising:
acquiring error noise data obtained by a first air conduction microphone that is mounted to a head-mounted wearable device proximate to a frame bridge on a front frame; and
acquiring reference noise data obtained by a second air conduction microphone that is mounted to the head-mounted wearable device proximate to the BCS.

18. The method of claim 16, the acquiring the noise data comprising:
acquiring error noise data obtained by an air conduction microphone that is mounted to a head-mounted wearable device proximate to a frame bridge on a front frame; and
acquiring reference noise data obtained by a bone conduction microphone that is mounted to the head-mounted wearable device proximate to the BCS.

19. The method of claim 17, the generating the cancellation audio data further comprising:
processing the reference noise data using an estimated secondary path function to generate first filtered data;
generating coefficient data using a filtered-x least mean square (FXLMS) function with the first filtered data and the error noise data as inputs; and processing the reference noise data using a filter function configured with the coefficient data to generate the cancellation audio data.

20. The method of claim 16, the acquiring the noise data comprising:

accessing the output data; and applying one or more transform functions to the output data to generate the noise data, wherein the transform functions are representative of the acoustically radiated sound.

21. The head-mounted wearable device of claim 3, wherein the structure comprises:

a bone conduction microphone mounted to the structure proximate to the BCS; and a front frame having a nosepiece configured to transmit vibrations to the bone conduction microphone;

wherein the noise data further comprises reference noise data indicative of the vibrations transmitted by the noise piece to be obtained using the bone conduction microphone.

22. A head-mounted wearable device comprising:

a first speaker mounted to a structure;

a second speaker mounted to the structure;

first control circuitry connected to the first speaker to provide a first signal to the first speaker that will present first audio output based on the first signal;

second control circuitry connected to the second speaker to provide a second signal to the second speaker that will present second audio output based on the second signal;

one or more memories, storing computer-executable instructions; and one or more hardware processors to execute the computer-executable instructions to:

access first data representative of audio to be presented;

operate the first control circuitry using the first data to generate the first audio output;

acquire second data;

generate third data based on the second data; and operate the second control circuitry using the third data to generate the second audio output, wherein the second audio output produces destructive acoustic interference.

\* \* \* \* \*

UNITED STATES PATENT AND TRADEMARK OFFICE
CERTIFICATE OF CORRECTION

Page 1 of 1

PATENT NO. : 10,699,691 B1
APPLICATION NO. : 15/637532
DATED : June 30, 2020
INVENTOR(S) : Geng Ye et al.

It is certified that error appears in the above-identified patent and that said Letters Patent is hereby corrected as shown below:

Column 20, Claim 14, Line 10:
Currently reads: "exterior side of the housing.".
Where it should read: --exterior side of the exterior housing.--.

Column 21, Claim 21, Line 21-22:
Currently reads: "transmitted by the noise piece to be obtained".
Where it should read: --transmitted by the nosepiece to be obtained--.

Signed and Sealed this
Thirteenth Day of October, 2020

Andrei Iancu
*Director of the United States Patent and Trademark Office*